United States Patent
Higashijima et al.

(10) Patent No.: US 7,457,468 B2
(45) Date of Patent: Nov. 25, 2008

(54) IMAGE CODING APPARATUS, DIGEST IMAGE PREPARING APPARATUS AND METHOD

(75) Inventors: Shigeki Higashijima, Machida (JP); Yukio Fujii, Yokohama (JP); Koichi Terada, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 722 days.

(21) Appl. No.: 10/890,262

(22) Filed: Jul. 14, 2004

(65) Prior Publication Data

US 2005/0074171 A1    Apr. 7, 2005

(30) Foreign Application Priority Data

Oct. 1, 2003    (JP) .............................. 2003-342755

(51) Int. Cl.
*G06K 9/36*    (2006.01)
*H04N 7/12*    (2006.01)

(52) U.S. Cl. ................... 382/232; 348/402.1; 348/403.1

(58) Field of Classification Search ...................... None
See application file for complete search history.

(56) References Cited

FOREIGN PATENT DOCUMENTS

JP    2002-010254    1/2002

OTHER PUBLICATIONS

K. Yoon et al., "Event Detection from MPEG Video In the Compressed Domain", ICPR, 2000.
D. Dementhon et al., "Video Summarization by Curve Simplification", ACM Multimedia 98, Sep. 1998, pp. 211-218.
EMC Proven Solution Brief, "EMC Backup-to-Disk Solutions", EMC Corporation, 2004, pp. 1-2.

*Primary Examiner*—Charles Kim
(74) *Attorney, Agent, or Firm*—McDermott Will & Emery LLP

(57) ABSTRACT

A digest image preparation apparatus includes an image coding circuit for receiving a moving picture to output a coded image obtained by coding the moving picture and extracting a certaing feature parameters produced upon the coding to be outputted, a feature vector computation circuit for receiving the feature parameters to output feature vectors of image frames defined in n dimensions and a curve simplification circuit for simplifying loci generated by arranging the n-dimensional feature vectors outputted by the feature vector computation circuit in time series manner to output ranking information. It then becomes possible to reduce a necessary cost for the image coding and a ranking information calculation.

12 Claims, 9 Drawing Sheets

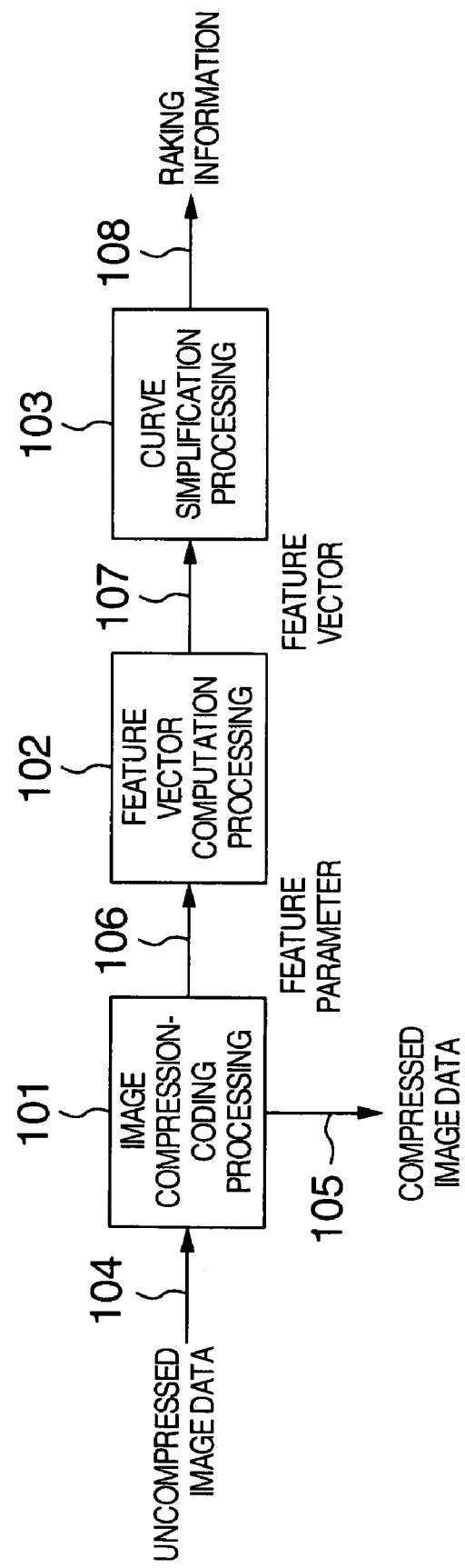

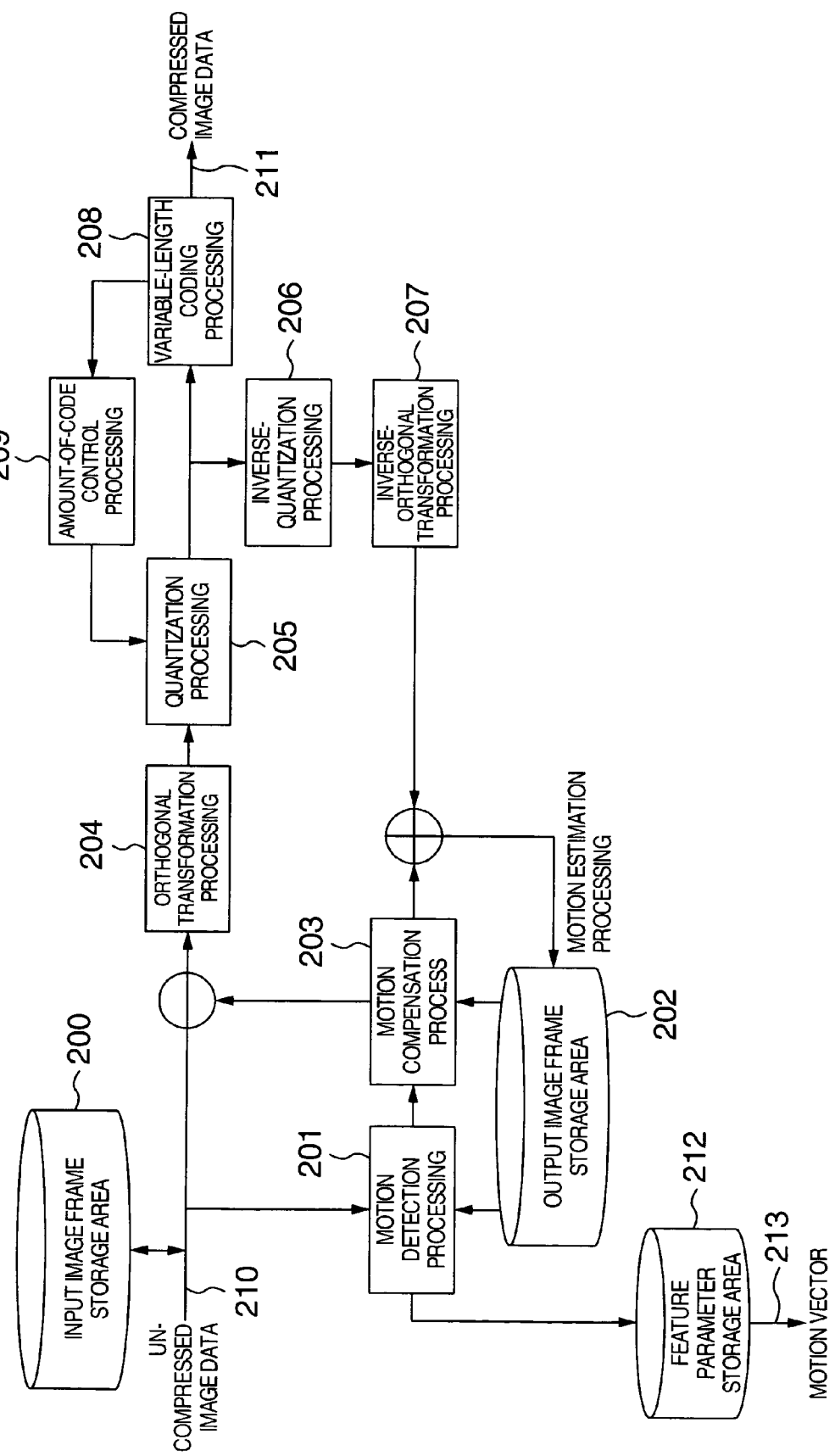

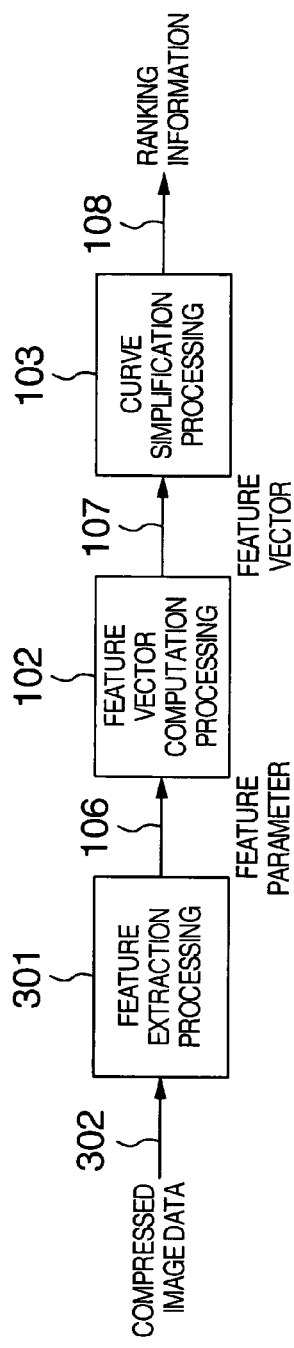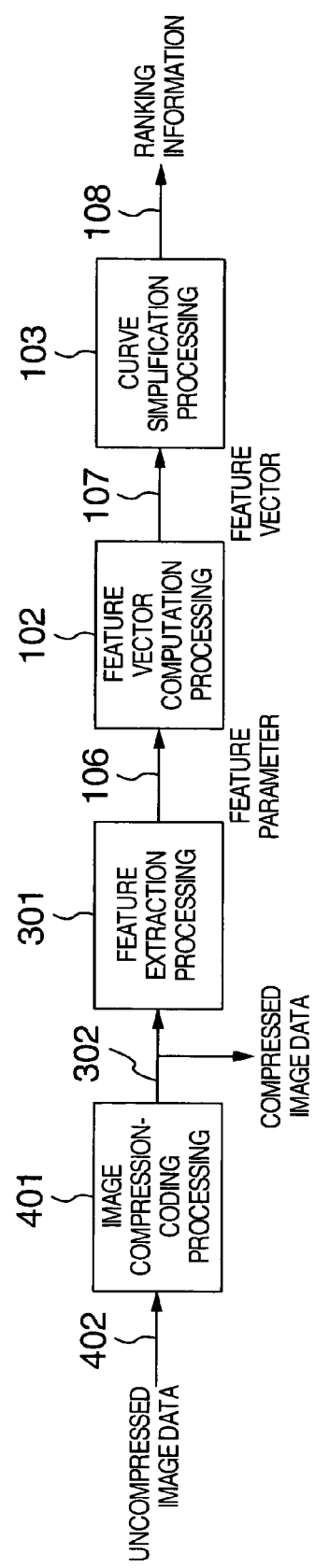

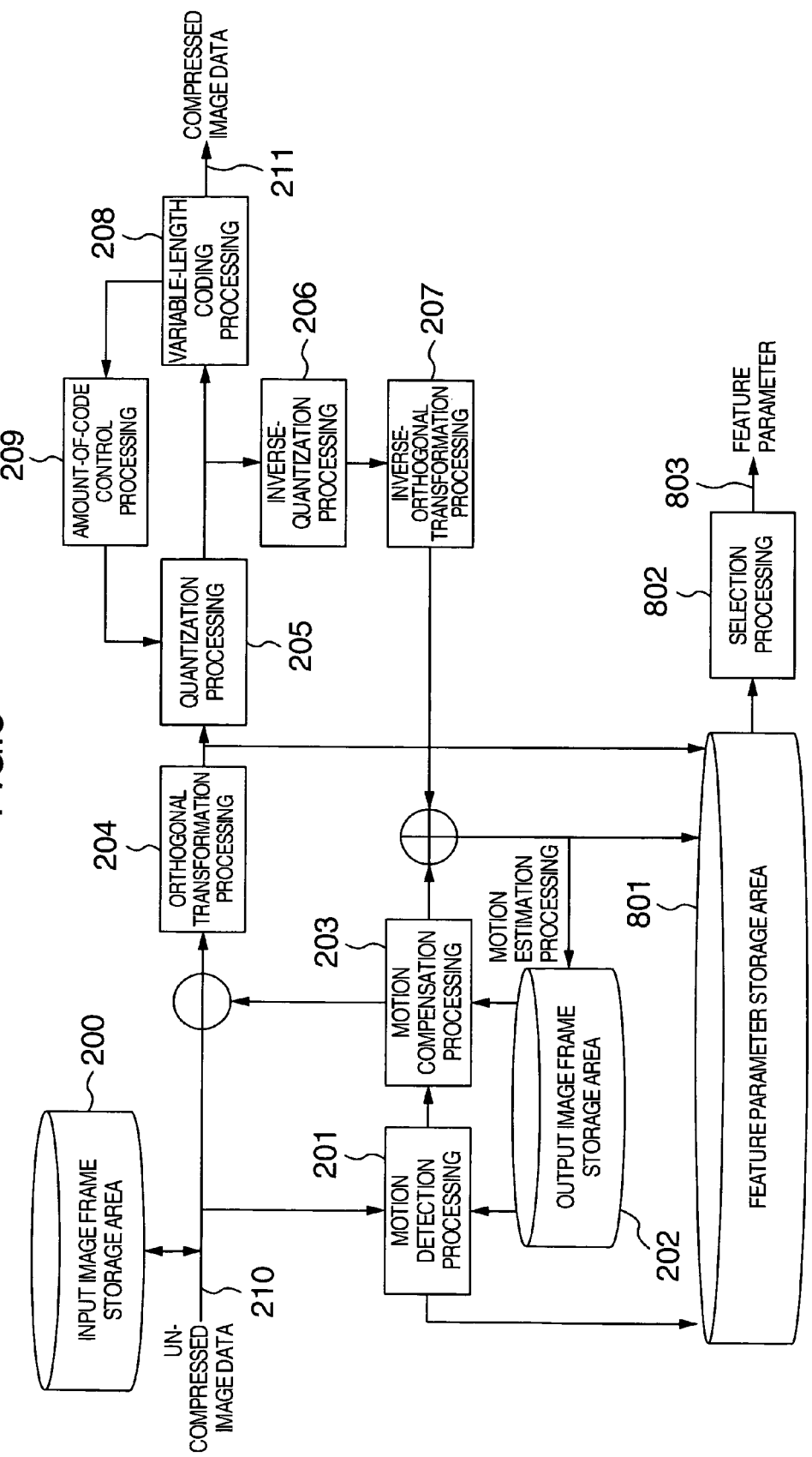

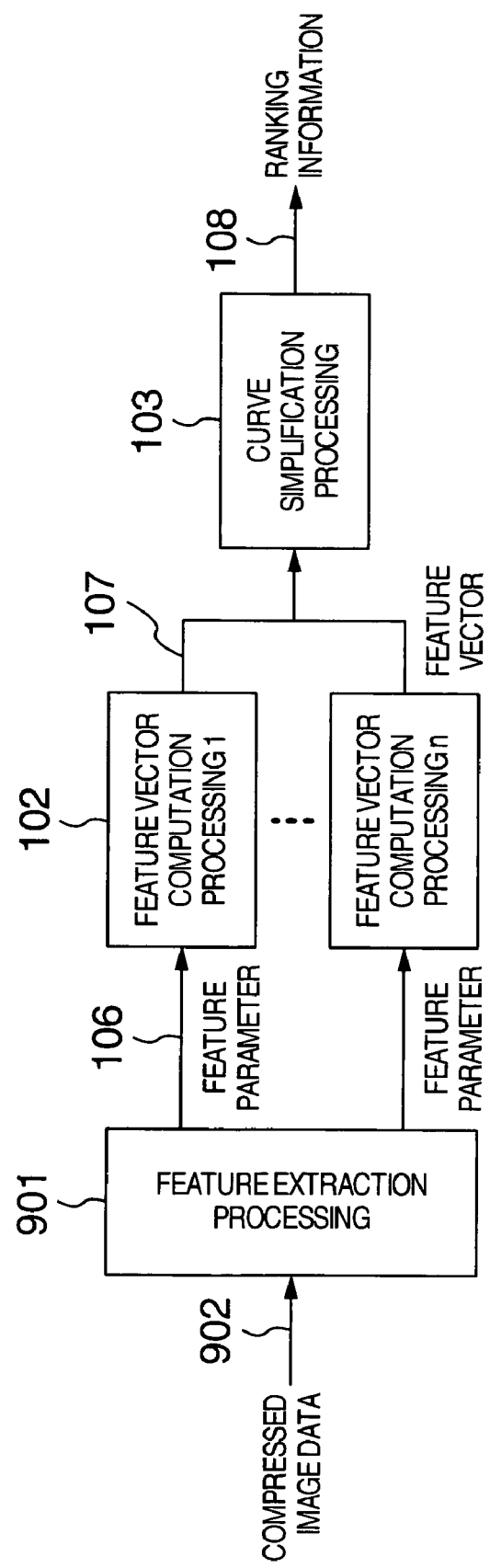

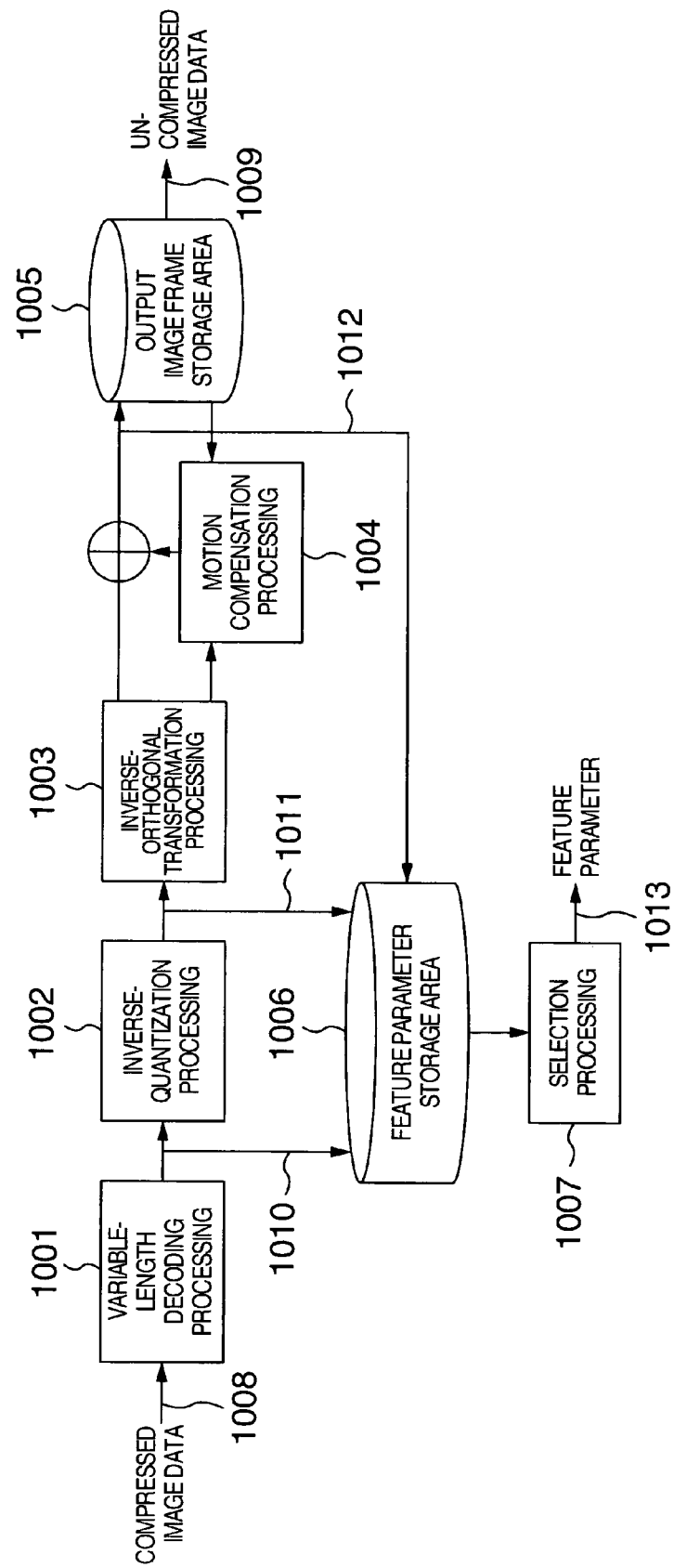

IMAGE CODING APPARATUS, DIGEST IMAGE PREPARING APPARATUS AND METHOD

INCORPORATION BY REFERENCE

The present application claims priority from Japanese application JP 2003-342755 filed on Oct. 1, 2003, the content of which is hereby incorporated by reference into this application.

BACKGROUND OF THE INVENTION

The present invention relates to a digest image preparing apparatus and a method of implementing the same and more particularly to an image coding apparatus for receiving uncompressed moving image data to produce compressed image data thereof and preparing ranking information.

Recently, plenty of digital compression-coding methods which can facilitate access to multi-media objects such as video and audio have been standardized. Audio compression-coding systems are standardized to MP3 (MPEG-1: Moving Picture Experts Group-1 Audio Layer-3: ISO/IEC11172-2), AAC (Advanced Audio Coding: ISO/IEC13818-7) and the like. Moving picture compression-coding systems are standardized to MPEG-1 (ISO/IEC11172-2), MPEG-2 (ITU-T H.262, ISO/IEC13818-2), MPEG-4 (ISO/IEC14496-2) and the like. These compression-coding techniques enable us to easily handle multi-media objects by compressing them without deteriorating their quality.

On the other hand, the video frame ranking computation method which is one of the video digest techniques ranks image frames constituting the moving picture in order of importance useful for understanding the contents of the moving picture. The image frames having the higher ranking are arranged in order of time to thereby make an abstract of the moving picture. The video digest techniques are disclosed in "Video Summarization by Curve Simplification", D. DeMenthon, V. Kobla and D. Doermann, ACM Multimedia 98, September 1998, pp. 211-218 and "Event Detection from MPEG Video in the Compressed Domain", K. Yoon, D. DeMenthon and D. Dermann, ICPR 2000.

SUMMARY OF THE INVENTION

The moving picture delivery service for delivering various digital image contents through a network such as the Internet while maintaining the high quality by compressing them begins to start presently. In this field, in order to circulate a large amount of digital image contents effectively, it is important that the users can select desired contents within a limited time to watch and listen the desired contents. In response to such a demand, attention is paid to the video digest technique for producing an abstract of the image contents.

An example of the video digest technique for meeting the demand is illustrated with reference to FIGS. 3 and 4.

FIG. 3 is a schematic diagram illustrating the processing in an apparatus for implementing the video ranking computation method. Feature parameters 106 characterizing the image frames are extracted from compressed image data 302 in feature extraction processing 301 and n-dimensional feature vectors 107 of the image frames are produced from the feature parameters 106 in feature vector computation processing 102. Loci generated by arranging the n-dimensional feature vectors 107 of the image frames in the time series manner are simplified in curve simplification processing 103 to thereby produce the ranking information 108 of the image frames.

The feature parameters 106 depend on the feature vector computation processing 102 to constitute motion vectors, DC (direct current) components or image frame data itself. In such a case, in the feature extraction processing 301, the inputted compressed image data can be expanded and decoded to thereby obtain the feature parameters 106.

FIG. 4 is a diagram illustrating an image coding apparatus or method of combining the image coding method and the ranking computation method to produce the ranking information. Uncompressed image data 402 is compression-coded to produce compressed image data 302 in image compression-coding processing 401. Feature parameters 106 of the image frames are extracted from the compressed image data 302 in feature extraction processing 301. N-dimensional vectors 107 of the image frames are produced from the feature parameters 106 in feature vector computation processing 102. Loci generated by arranging the feature vectors 107 in the time series manner are simplified in curve simplification processing 103 to thereby compute the ranking information 108 of the image frames.

It is an object of the present invention to provide an apparatus and a method of reducing the cost for coding of the image and computation of the ranking information to thereby prepare a digest image effectively.

In order to solve the above problems, according to the present invention, a digest image preparation apparatus for performing feature vector computation processing and curve simplification processing on the basis of predetermined feature parameters of an inputted moving picture to obtain ranking information and preparing a digest image of the moving picture on the basis of the ranking information, comprises image coding means for receiving the moving picture to output a coded image obtained by coding the moving picture and extracting predetermined feature parameters produced upon the coding to be outputted, feature vector computation means for receiving the feature parameters to output feature vectors of image frames defined in n dimensions and curve simplification means for simplifying loci generated by arranging the n-dimensional feature vectors outputted by the feature vector computation means in time series manner.

Further, the predetermined feature parameters are produced upon the compression-coding and includes, for example, motion vectors and DC component.

According to the present invention, the ranking information can be computed without implementation of feature extraction processing required in a conventional system, so that the cost required for coding of the image and calculation of the ranking information can be reduced.

BRIEF DESCRIPTION OF THE DRAWINGS

FIG. 1 is a schematic diagram illustrating an image coding apparatus according to a first embodiment of the present invention;

FIG. 2 is a schematic diagram illustrating detailed image compression-coding processing of the image coding apparatus according to the first embodiment of the present invention;

FIG. 3 is a schematic diagram illustrating a ranking computation system;

FIG. 4 is a schematic diagram illustrating an image coding apparatus for producing ranking information;

FIG. 8 is a schematic diagram illustrating image compression-coding processing of the image coding apparatus according to the second embodiment of the present invention;

FIG. 9 is a schematic diagram illustrating a ranking computation system according to a third embodiment of the present invention; and FIG. 10 is a schematic diagram illustrating feature extraction processing of the ranking computation system according to the third embodiment of the present invention.

DESCRIPTION OF THE EMBODIMENTS

Figure 5:
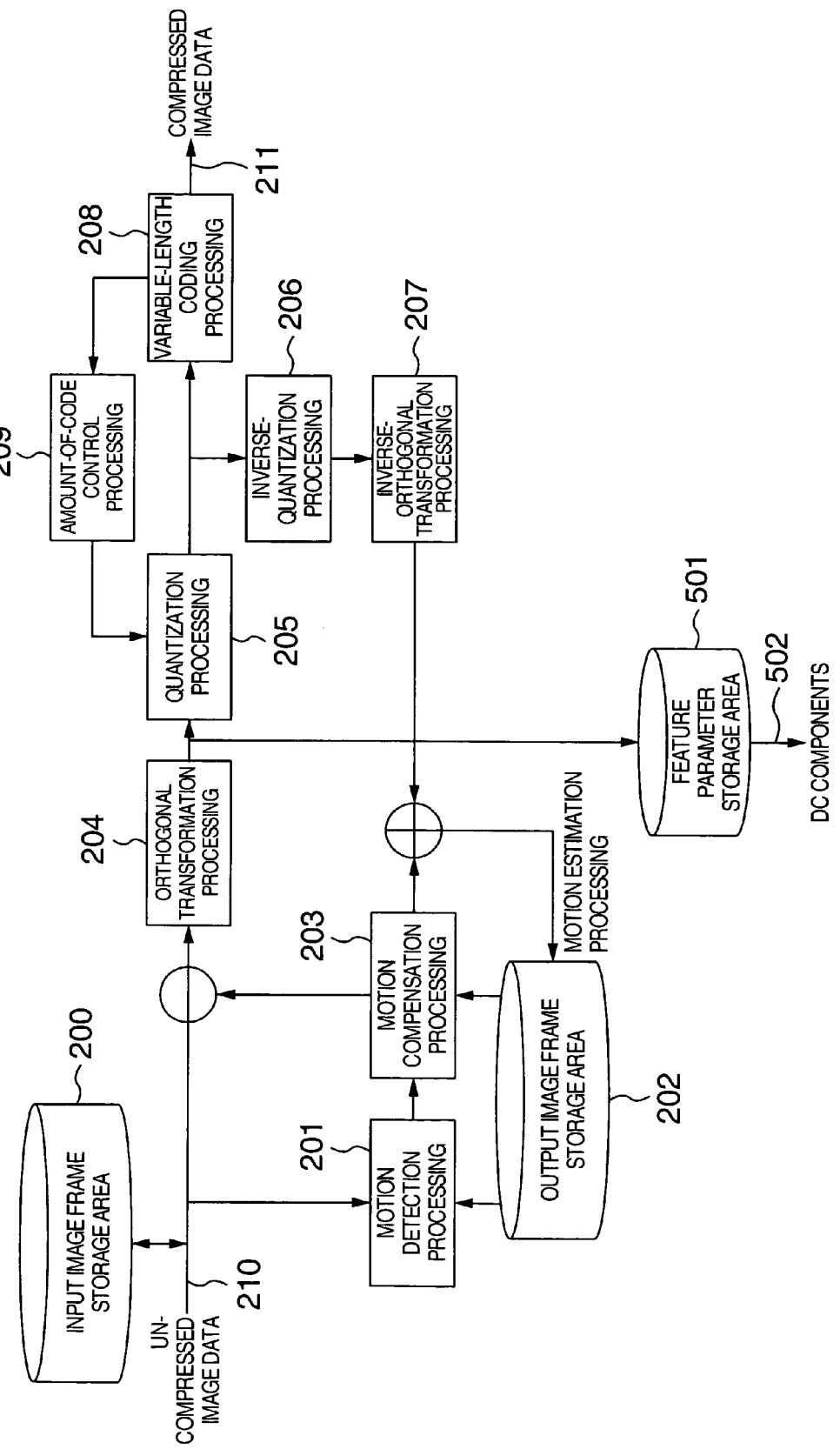
FIG. 5 is a schematic diagram illustrating another image compression-coding processing of the image coding apparatus according to the first embodiment of the present invention.

Embodiments of the present invention are now described with reference to the accompanying drawings.

A first embodiment of the present invention is described with reference to FIGS. 1, 2, 5 and 6.

FIG. 1 schematically illustrates an image coding apparatus according to the first embodiment of the present invention. The image coding apparatus of the embodiment includes image compression-coding processing 101, feature vector computation processing 102 and curve simplification processing 103.

The image compression-coding processing 101 compression-codes or compresses uncompressed image data 104 by means of some image compression-coding system. The image compression-coding processing 101 produces compressed image data 105 and maintains intermediate data produced upon the compression-coding in the unit of image frame to produce it as feature parameters 106.

The feature vector computation processing 102 produces feature vectors 107 defined in n dimensions from the feature parameters 106. Loci generated by arranging the n-dimensional feature vectors 107 in the time series manner are simplified by the curve simplification processing 103 to thereby produce the ranking information 108 of the image frames.

The image frames having the higher ranking can be arranged in order of time on the basis of the ranking information to thereby make an abstract, so that a digest image can be prepared. The video digest technique for producing the abstract of the moving picture can be applied to detection of abnormality in a monitoring system. For example, in the monitoring system including an MPEG encoder, when data inputted from monitoring cameras to a concentrated monitoring center is compressed to produce compressed data for preservation and digest information is produced therefrom, the video digest technique can be applied to the monitoring system.

Referring now to FIG. 2, the image compression-coding processing in the first embodiment is described. In the embodiment, uncompressed image data is compression-coded in the format of MPEG-2, although the present invention is not limited thereto.

FIG. 2 is a schematic diagram illustrating the image compression-coding processing in the first embodiment in detail. In the image compression-coding processing of the embodiment, when uncompressed image data 210 is inputted, compressed image data 211 is outputted and motion vectors produced upon compression-coding are maintained as feature parameters in the unit of image frame and outputted to be supplied to the feature vector computation processing.

When the uncompressed image data 210 received in the unit of image frame is I picture (Intra-picture) or P picture (Predictive-picture), the uncompressed image data 210 is compression-coded by the following processing. On the other hand, when the uncompressed image data 210 is B picture (Bidirectionally predictive-picture), the uncompressed image data is stored in an input image frame storage area 200 and oldest image frame data is taken out from image frame data stored in the input image frame storage area 200 to be compressed by the following processing.

When the uncompressed image data 210 is P picture or B picture, motion detection processing 201 decides a motion compensation prediction system, motion vectors and the like on the basis of macro-block data to be coded within the image frame data to be compression-coded and reference image frame data in an output image frame storage area 202. At this time, the motion vectors obtained thus are stored in a feature parameter storage area 212 in the unit of image frame separately.

Next, motion compensation processing 203 refers to the reference image frame data in the output image frame storage area 202 on the basis of information such as the motion vector obtained by the motion detection processing 201 to extract reference macro-block data.

Orthogonal transformation processing 204 calculates difference between the extracted reference macro-block data and the macro-block data to be coded and orthogonally transforms the difference data. Quantization processing 205 quantizes the orthogonally transformed macro-block data. On the other hand, when the uncompressed image data is I picture, the orthogonal transformation processing 204 orthogonally transforms the macro-block data to be coded within the image frame data to be compression-coded without calculation of difference as it is and the quantization processing 205 quantizes the orthogonally transformed macro-block data.

Variable-length coding processing 208 variable-length codes the macro-block data subjected to the above processing including the quantization processing 205 and motion vectors and parameters such as quantization parameters used in the above processing and produces compressed image data 211.

Amount-of-code control processing 209 decides a proper quantization scale in accordance with the amount of data produced by the variable-length coding processing 208 and feeds back it to the quantization processing 205.

When the coded macro-block data is I picture or P picture, the macro-block data subjected to the above processing and the motion vectors and the parameters such as the quantization parameters used in the above processing are used to reconstruct macro-blocks and produce the reference image frame data.

More particularly, the macro-block data subjected to the quantization processing 205 is subjected to inverse-quantization processing 206 and inverse-orthogonal transformation processing 207. Further, when the macro-block data is P picture, the macro-block data is added to the reference macro-block data extracted by the motion compensation processing 203 to calculate the sum thereof. The reconstructed macro-block data is stored in a reference image frame data area within the output image frame storage area 202.

Finally, when the compression coding processing of the macro-block for one image frame is completed, old reference image frame data within the output image frame storage area 202 is deleted so as to update the reference image frame data within the output image frame storage area 202. Further, the motion vectors 213 stored in the feature parameter storage area 212 are outputted to be supplied to the feature vector computation processing in the unit of image frame.

FIG. 5 schematically illustrates another example of the image compression-coding processing in the first embodiment shown in FIG. 2. In the image compression-coding processing of the embodiment, when uncompressed image data 210 is inputted, compressed image data 211 is outputted and DC components produced upon compression-coding is maintained as feature parameters in the unit of image frame and outputted to be supplied to the feature vector computation processing.

When the uncompressed image data 210 received in the unit of image frame is I picture or P picture, the uncompressed image data 210 is compression-coded by the following processing. On the other hand, when the uncompressed image data 210 is B picture, the uncompressed image data is stored in the input image frame storage area 200 and oldest image frame data is taken out from image frame data stored in the input image frame storage area 200 to be compression-coded by the following processing.

When the uncompressed image data is P picture or B picture, motion detection processing 201 decides a motion compensation prediction system, motion vectors and the like on the basis of macro-block data to be coded within the image frame data to be compression-coded and reference image frame data in the output image frame storage area 202.

Next, the motion compensation processing 203 refers to the reference image frame data in the output image frame storage area 202 on the basis of information such as the motion vectors obtained by the motion detection processing 201 to extract the reference macro-block data. The orthogonal transformation processing 204 orthogonally transforms difference data between the extracted reference macro-block data and the macro-block data to be coded and the quantization processing 205 quantizes the orthogonally transformed macro-block data. On the other hand, when the uncompressed image data is I picture, the orthogonal transformation processing 204 orthogonally transforms the macro-block data to be coded within the image frame data to be compression-coded without calculation of difference as it is and the quantization processing 205 quantizes the orthogonally transformed macro-block data.

At this time, the DC components of the macro-block data obtained by the orthogonal transformation processing 204 are stored in a feature parameter storage area 501 in the unit of image frame separately.

After the quantization processing 205, the variable-length coding processing 208 variable-length codes the macro-block data subjected to the above processing and motion vectors and parameters such as quantization parameters used in the above processing and produces compressed image data 211. The amount-of-code control processing 209 decides a proper quantization scale in accordance with the amount of data produced by the variable-length coding processing 208 and feeds back it to the quantization processing 205.

When the coded macro-block data is I picture or P picture, the macro-block data subjected to the above processing and the motion vectors and the parameters such as the quantization parameters used in the above processing are used to reconstruct macro-blocks and produce the reference image frame data.

First, the macro-block data subjected to the quantization processing 205 is subjected to the inverse-quantization processing 206 and the inverse-orthogonal transformation processing 207. When the macro-block data is P picture, the macro-block data is added to the reference macro-block data extracted by the motion compensation processing 203 to calculate the sum thereof. The reconstructed macro-block data is stored in the reference image frame data area within the output image frame storage area 202.

Finally, when the coding processing of the macro-block for one image frame is completed, old reference image frame data within the output image frame storage area 202 is deleted so as to update the reference image frame data within the output image frame storage area 202. Further, the DC components 502 stored in the feature parameter storage area 501 are outputted to be supplied to the feature vector computation processing in the unit of image frame.

Figure 6:
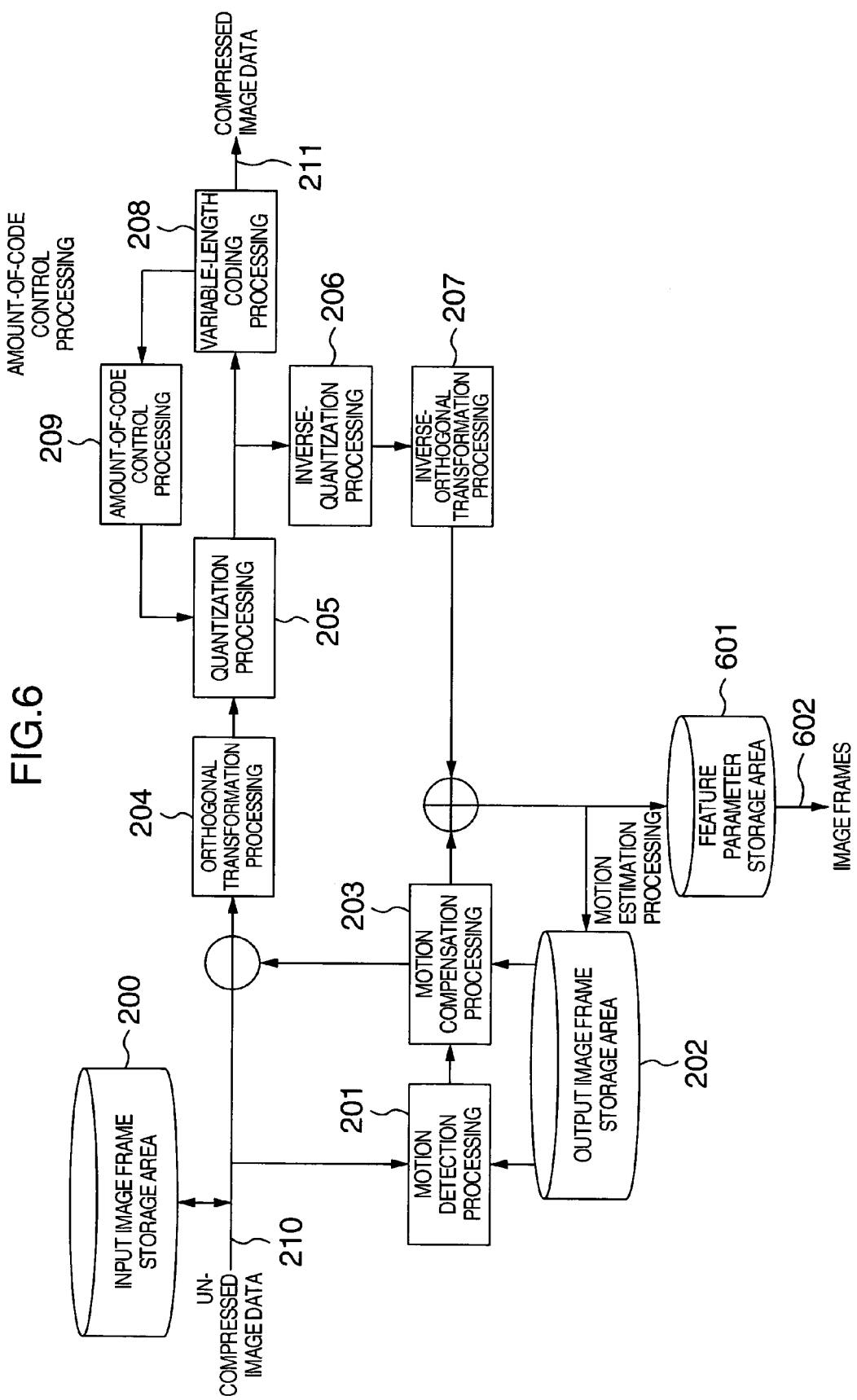
FIG. 6 is a schematic diagram illustrating still another image compression-coding processing of the image coding apparatus according to the first embodiment of the present invention.

FIG. 6 schematically illustrates another example of the image compression-coding processing in the first embodiment. In the image compression-coding processing of the embodiment, when uncompressed image data 210 is inputted, compressed image data 211 is outputted and image frame data produced upon compression-coding is maintained as feature parameters in the unit of image frame and outputted to be supplied to the feature vector computation processing.

When the uncompressed image data 210 received in the unit of image frame is I picture or P picture, the uncompressed image data 210 is compression-coded by the following processing. On the other hand, when the uncompressed image data 210 is B picture, the uncompressed image data is stored in the input image frame storage area 200 and oldest image frame data is taken out from the image frame data stored in the input image frame storage area 200 to be compression-coded by the following processing.

When the uncompressed image data is P picture or B picture, the motion detection processing 201 decides a motion compensation prediction system, motion vectors and the like on the basis of macro-block data to be coded within the image frame data to be compression-coded and reference image frame data in the output image frame storage area 202.

Next, the motion compensation processing 203 refers to the reference image frame data in the output image frame storage area 202 on the basis of information such as the motion vectors obtained by the motion detection processing 201 to extract the reference macro-block data. The orthogonal transformation processing 204 orthogonally transforms difference data between the extracted reference macro-block data and the macro-block data to be coded and the quantization processing 205 quantizes the orthogonally transformed macro-block data.

On the other hand, when the uncompressed image data is I picture, the orthogonal transformation processing 204 orthogonally transforms the macro-block data to be coded within the image frame data to be compression-coded without calculation of difference as it is and the quantization processing 205 quantizes the orthogonally transformed macro-block data.

After the quantization processing 205, the variable-length coding processing 208 variable-length codes the macro-block data subjected to the above processing and motion vectors and parameters such as quantization parameters used in the above processing and produces compressed image data 211. The amount-of-code control processing 209 decides a proper quantization scale in accordance with the amount of data produced by the variable-length coding processing 208 and feeds back it to the quantization processing 205.

Next, the macro-block data subjected to the above processing and the motion vectors and the parameters such as the quantization parameters used in the above processing are used to reconstruct macro-blocks and produce the image frame data. First, the macro-block data subjected to the quantization processing 205 is subjected to the inverse-quantization processing 206 and the inverse-orthogonal transformation processing 207. When the macro-block data is P picture or B picture, the macro-block data is added to the reference macro-block data extracted by the motion compensation processing 203 to calculate the sum thereof.

The reconstructed macro-block data is stored in the feature parameter storage area 601 in the unit of image frame. When the macro-block data is I picture or P picture, the reconstructed macro-block data is further stored in the reference image frame data area within the output image frame storage area 202.

Finally, when the coding processing of the macro-block for one image frame is completed, old reference image frame data within the output image frame storage area 202 is deleted so as to update the reference image frame data within the output image frame storage area 202. Further, the image frame data 602 stored in the feature parameter storage area 601 is outputted to be supplied to the feature vector computation processing.

A second embodiment of the present invention is now described with reference to FIGS. 7 and 8.

Figure 7:
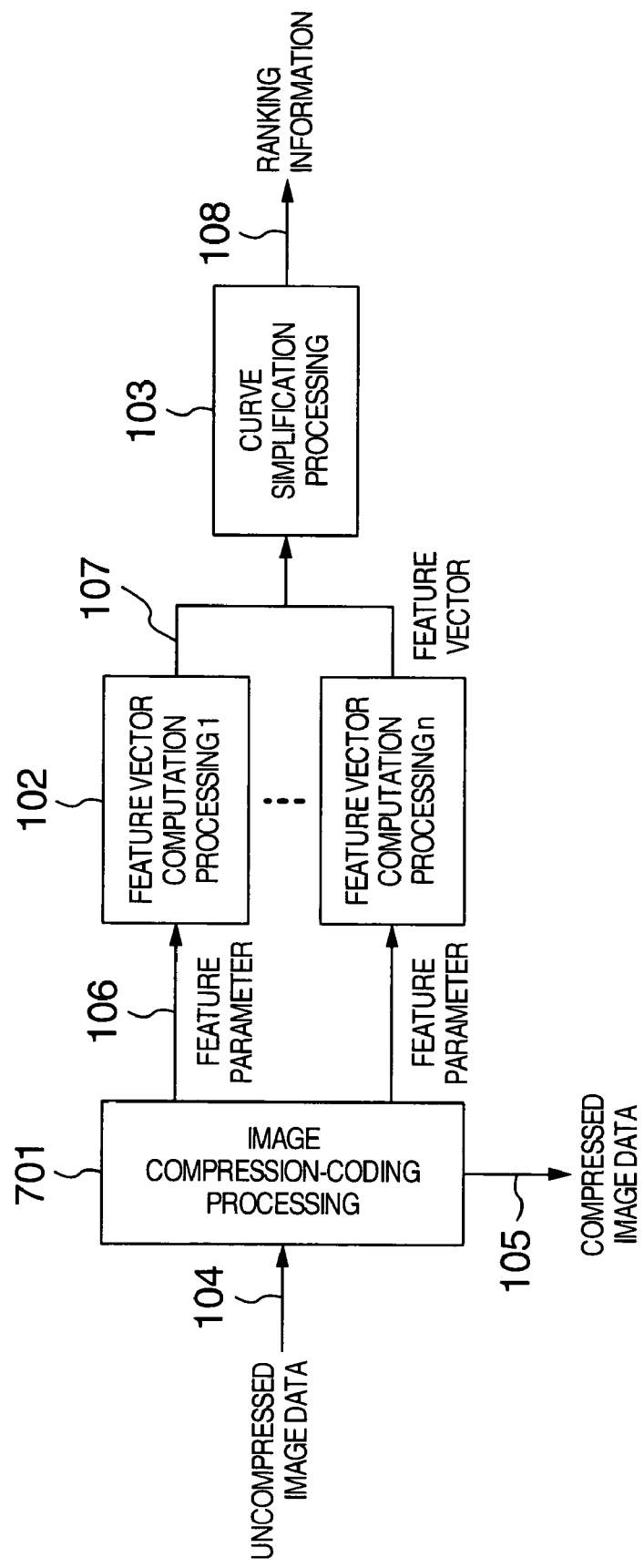
FIG. 7 is a schematic diagram illustrating an image coding apparatus according to a second embodiment of the present invention.

FIG. 7 schematically illustrates an image coding apparatus according to the second embodiment of the present invention. The image coding apparatus of the embodiment includes image compression-coding processing 701, one or more feature vector computation processing 102 and curve simplification processing 103. The image compression-coding processing 701 compression-codes uncompressed image data 104 by means of the image compression-coding system to produce compressed image data 105 and maintains one or more intermediate data produced upon the compression-coding in the unit of image frame, so that proper intermediate data among them is outputted as the feature parameters 106 to be supplied to relevant feature vector computation processing 102. One or more feature vector computation processing 102 each produces the feature vectors 107 defined in n dimensions from the feature parameters 106. The curve simplification processing 103 simplifies loci generated by arranging the n-dimensional feature vectors 107 in the time series manner to thereby produce the ranking information 108 of the image frames.

Referring now to FIG. 8, the image compression-coding processing of the second embodiment is described in detail. In the embodiment, uncompressed image data is compression-coded in the format of MPEG-2, although the present invention is not limited thereto.

FIG. 8 illustrates an example of image compression-coding processing in the second embodiment. In the image compression-coding processing of the embodiment, when uncompressed image data 210 is inputted, compressed image data 211 is outputted and motion vectors, DC components and image frame data produced upon the compression-coding are maintained in the unit of image frame. Optimum information is selected from them and outputted as feature parameters to be supplied to relevant feature vector computation processing.

When the uncompressed image data 210 received in the unit of image frame is I picture or P picture, the uncompressed image data 210 is compression-coded by the following processing.

On the other hand, when the uncompressed image data 210 is B picture, the uncompressed image data 210 is stored in the input image frame storage area 200 and oldest image frame data is taken out from the image frame data stored in the input image frame storage area 200 to be compression-coded by the following processing.

When the uncompressed image data is P picture or B picture, the motion detection processing 201 decides the motion compensation prediction system, motion vectors and the like on the basis of macro-block data to be coded within the image frame data to be compression-coded and reference image frame data in the output image frame storage area 202. At this time, the motion vectors obtained thus are stored in a feature parameter storage area 801 in the unit of image frame separately.

Next, the motion compensation processing 203 refers to the reference image frame data in the output image frame storage area 202 on the basis of information such as the motion vectors obtained by the motion detection processing 201 to extract the reference macro-block data. The orthogonal transformation processing 204 orthogonally transforms difference data between the extracted reference macro-block data and the macro-block data to be coded and the quantization processing 205 quantizes the orthogonally transformed macro-block data.

On the other hand, when the uncompressed image data is I picture, the orthogonal transformation processing 204 orthogonally transforms the macro-block data to be coded within the image frame data to be compression-coded without calculation of difference as it is and the quantization processing 205 quantizes the orthogonally transformed macro-block data. At this time, DC components of the macro-block data obtained by the orthogonal transformation processing 204 are stored in the feature parameter storage area 801 in the unit of image frame separately.

After the quantization processing 205, the variable-length coding processing 208 variable-length codes the macro-block data subjected to the above processing and motion vectors and parameters such as quantization parameters used in the above processing and produces compressed image data 211. The amount-of-code control processing 209 decides a proper quantization scale in accordance with the amount of data produced by the variable-length coding processing 208 and feeds back it to the quantization processing 205.

Next, the macro-block data subjected to the above processing and the motion vectors and the parameters such as the quantization parameters used in the above processing are used to reconstruct macro-blocks and produce the image frame data. First, the macro-block data subjected to the quantization processing 205 is subjected to the inverse-quantization processing 206 and the inverse-orthogonal transformation processing 207.

When the macro-block data is P picture or B picture, the macro-block data is added to the reference macro-block data extracted by the motion compensation processing 203 to calculate the sum thereof. The reconstructed macro-block data is stored in the feature parameter storage area 801 in the unit of image frame.

When the macro-block data is I picture or P picture, the reconstructed macro-block data is further stored in the reference image frame data area within the output image frame storage area 202.

Finally, when the coding processing of the macro-block for one image frame is completed, old reference image frame data within the output image frame storage area 202 is deleted so as to update the reference image frame data within the output image frame storage area 202.

Further, selection processing 802 selects proper feature parameters 803 from the motion vectors, the DC components and the image frame data stored in the feature parameter storage area 801 in the unit of image frame and outputs the selected feature parameters to be supplied to the feature vector computation processing.

A third embodiment of the present invention is now described with reference to FIGS. 9 and 10.

FIG. 9 illustrates an example of a ranking information computation apparatus of the third embodiment. The ranking information computation apparatus of the embodiment includes feature extraction processing 901, one or more feature vector computation processing 102 and curve simplification processing 103.

The feature extraction processing 901 extracts one or more kinds of feature parameters from the compressed image data 902 to be maintained in the unit of image frame and outputs proper feature parameters therefrom to be supplied to relevant feature vector computation processing 102. One or more feature vector computation processing 102 produces the feature vectors 107 defined in n dimensions from the feature parameters 106. The curve simplification processing 103 simplifies loci generated by arranging the n-dimensional feature vectors 107 in the time series manner to thereby produce the ranking information 108 of the image frames.

Referring now to FIG. 10, feature extraction processing of the ranking computation apparatus of the present invention is described.

In the embodiment, expansion and decoding processing of the image compressed data coded in the format of MPEG-2 is described, although the present invention is not limited thereto.

Variable-length decoding processing 1001 variable-length decodes compressed image data 1008 coded in the format of MPEG-2 to obtain configuration information of the image, the image data in the unit of macro-data, the quantization scale, the motion vectors and the like. The motion vectors obtained at this time are stored in a feature parameter storage area 1006 in the unit of image frame.

Inverse-quantization processing 1002 inverse-quantizes the macro-block data with reference to the quantization scale, the quantization matrix and the like and stores the DC components in the feature parameter storage area 1006 in the unit of image frame.

Inverse-orthogonal transformation processing 1003 subjects the inverse-quantized macro-block data to inverse-orthogonal transformation. Particularly, when the image frame of the macro-block being decoded currently is P picture or B picture, motion compensation processing 1004 refers to reference image frame data within an output image frame storage area 1005 on the basis of the motion compensation prediction system and information such as motion vectors to extract reference macro-block data and adds the macro-block data subjected to the inverse-orthogonal transformation processing 1003 to the extracted reference macro-block data to calculate the sum thereof. The macro-block data which has been expanded and decoded by means of the above processing is stored in the feature parameter storage area 1006 in the unit of image frame.

When the image frame is I picture or P picture, the expanded and decoded macro-block data is further stored in a reference image frame data area within the output image frame storage area 1005.

When the expansion and decoding of the macro-block for one image frame are completed, selection processing 1007 selects proper feature parameters 1013 from the motion vectors, the DC components and the image frame data stored in the feature parameter storage area 1006 in the unit of image frame and outputs the selected feature parameters to be supplied to the relevant feature vector computation processing. When the expanded and decoded image frame is I picture or P picture, the reference image frame data in the output image frame storage area 1005 is updated. The update is so made that older one of two reference image frame data is deleted and the decoded image frame data is newly set to the reference image frame data.

As described in the above embodiments, the abstract or digest of the contents can be prepared effectively so that the user can select his desired contents from a large amount of contents easily.

Further, the compressed image data for delivery is prepared and the digest thereof is also prepared. The ranking information can be calculated with the reduced cost required for coding of the image and calculation of the ranking information. Reduction of the cost contributes to saving of electricity, compactness of the apparatus or reduction of network load.

In the above embodiments, the image coding apparatus and the ranking computation apparatus are used by way of example, although the system including processing provided by the respective apparatuses can be also applied.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A ranking information preparation apparatus for preparing ranking information on ranking regarding importance of each of a series of inputted moving pictures, comprising:
    image coding means for receiving the moving picture to output a coded image obtained by coding the moving picture and extracting predetermined feature parameters produced upon the coding to be outputted;
    feature vector computation means for receiving said feature parameters to output feature vectors of image frames defined in n dimensions; and
    curve simplification means for simplifying loci generated by arranging said n-dimensional feature vectors outputted by said feature vector computation means in time series manner to output the ranking information on ranking regarding importance of each of the series of moving pictures, wherein:
    when the kind of the frame of said inputted moving picture is P picture or B picture, said feature parameters are decided on the basis of the relation of the moving picture and previously maintained moving picture in said image coding means; and
    when the kind of the frame of said inputted moving picture is I picture, said feature parameters are obtained by orthogonally transforming said inputted moving picture by said image coding means.

2. A ranking information preparation apparatus according to claim 1, wherein
    said feature parameters are decided on the basis of the relation of the moving picture having been coded by said image coding means and said inputted moving picture.

3. A ranking information preparation apparatus according to claim 2, wherein
    said decided feature parameters are motion vectors.

4. A ranking information preparation apparatus according to claim 1, wherein
    said image coding means includes processing for orthogonally transforming said inputted moving picture; and
    said feature parameters are obtained by said orthogonal transformation processing.

5. A ranking information preparation apparatus according to claim 1, wherein
    said feature parameters are DC components obtained by said orthogonal transformation processing.

6. A ranking information preparation apparatus according to claim 1, wherein
said feature parameters are maintained for each frame unit of the inputted moving picture by said image coding means; and
said feature parameters are extracted on the basis of a kind of a frame of the inputted moving picture.

7. A digest image preparation method using a digest image preparation apparatus for receiving a moving picture and coding the moving picture to produce a coded image, comprising the steps of:
extracting predetermined feature parameters produced upon the coding;
producing feature vectors of image frames defined in n dimensions by means of said extracted feature parameters;
simplifying loci generated by arranging said produced n-dimensional feature vectors in time series manner;
preparing ranking information by said simplification, wherein:
when the kind of the frame of the inputted moving picture is P picture or B picture, said feature parameters are decided on the basis of the relation of the moving picture and previously maintained moving picture in said coding, and
when the kind of the frame of the inputted moving picture is I picture, the feature parameters are obtained by orthogonally transforming the inputted moving picture by said coding; and
preparing a digest image of the moving picture on the basis of said prepared ranking information.

8. An image coding apparatus for compression-coding inputted uncompressed image data, comprising:
image coding means for receiving uncompressed image to produce compressed image obtained by coding said uncompressed image and maintaining predetermined feature parameters produced upon the coding for each image frame to be outputted;
feature vector computation means for receiving said feature parameters outputted by said image coding means and outputting feature vectors of image frames defined in n dimensions; and
curve simplification means for simplifying loci generated by arranging said n-dimensional feature vectors outputted by said feature vector computation means in time series manner to thereby produce ranking information of the image frames, wherein:
when the kind of the frame of the inputted uncompressed image is P picture or B picture, said feature parameters are decided on the basis of the relation of the uncompressed image and previously maintained uncompressed image in said image coding means, and
when the kind of the frame of the inputted uncompressed image is I picture, the feature parameters are obtained by orthogonally transforming the inputted uncompressed image by said image coding means.

9. An image coding apparatus for compression-coding inputted uncompressed image data, comprising:
image coding means for receiving uncompressed image to produce compressed image obtained by coding said uncompressed image and maintaining one or more kinds of feature parameters produced upon the coding for each image frame to output proper feature parameters among them;
one or more feature vector computation means for receiving said feature parameters outputted by said image coding means and outputting feature vectors of image frames defined in n dimensions; and
curve simplification means for simplifying loci generated by arranging said n-dimensional feature vectors outputted by said feature vector computation means in time series manner to thereby produce ranking information, wherein:
when the kind of the frame of the inputted uncompressed image is P picture or B picture, said feature parameters are decided on the basis of the relation of the uncompressed image and previously maintained uncompressed image in said image coding means, and
when the kind of the frame of the inputted uncompressed image is I picture, the feature parameters are obtained by orthogonally transforming the inputted uncompressed image by said image coding means.

10. A ranking computation apparatus for obtaining ranking information, comprising:
feature extraction means for receiving inputted compressed image and maintaining one or more kinds of feature parameters for each image frame to output proper feature parameters among them;
one or more feature vector computation means for receiving said feature parameters outputted by said feature extraction means and outputting feature vectors of image frames defined in n dimensions; and
curve simplification means for simplifying loci generated by arranging said n-dimensional feature vectors outputted by said feature vector computation means in time series manner to thereby produce the ranking information, wherein:
when the kind of the frame of the inputted compressed image is P picture or B picture, said feature parameters are decided on the basis of the relation of the compressed image and previously maintained compressed image in said feature extraction means, and
when the kind of the frame of the inputted compressed image is I picture, the feature parameters are obtained by orthogonally transforming the inputted compressed image by said feature extraction means.

11. A digest image preparation apparatus comprising:
image coding means for receiving a series of moving pictures to output a coded image obtained by coding the moving picture and extracting predetermined feature parameters produced upon the coding to be outputted;
feature vector computation means for receiving said feature parameters to output feature vectors of image frames defined in n dimensions; and
curve simplification means for simplifying loci generated by arranging said n-dimensional feature vectors outputted by said feature vector computation means in time series manner to output ranking information on ranking of importance of each of the series of moving pictures,
wherein a digest image is generated by rearranging the moving pictures in accordance with the ranking, wherein:
when the kind of the frame of the inputted moving picture is P picture or B picture, said feature parameters are decided on the basis of the relation of the moving picture and previously maintained moving picture in said image coding means, and
when the kind of the frame of the inputted moving picture is I picture, the feature parameters are obtained by orthogonally transforming the inputted moving picture by said image coding means.

12. A digest image preparation apparatus according to claim 11, wherein said image coding means includes an input image frame memory for storing said received moving picture, a coding circuit for coding data stored in said input image frame memory and extracting feature parameters from said moving picture by referring to data stored in an output image frame memory and a feature parameter memory for storing said data coded by said coding means together with said extracted parameters, and said image coding means quantizes difference between said inputted moving picture and said data stored in said output image frame memory to form said coded image.

* * * * *